(12) United States Patent
Shimizu

(10) Patent No.: US 6,791,618 B1
(45) Date of Patent: Sep. 14, 2004

(54) PHOTOGRAPHING SYSTEM WITH IMPROVED TIME SETTING

(75) Inventor: Hitoshi Shimizu, Kaisei-machi (JP)

(73) Assignee: Fuji Photo Film Co., Ltd., Kanagawa-ken (JP)

(*) Notice: Subject to any disclaimer, the term of this patent is extended or adjusted under 35 U.S.C. 154(b) by 0 days.

(21) Appl. No.: 09/460,433

(22) Filed: Dec. 14, 1999

(30) Foreign Application Priority Data

Dec. 15, 1998 (JP) .......................................... 10/356399

(51) Int. Cl.[7] .......................... H04N 5/235; H04N 7/18
(52) U.S. Cl. ........................................ 348/362; 348/73
(58) Field of Search .............................. 348/61, 73, 79, 348/80, 131, 135, 362–365, 370; 382/128, 129, 133, 134; 359/363, 368; H04N 5/235, 7/18

(56) References Cited

U.S. PATENT DOCUMENTS

| | | | | |
|---|---|---|---|---|
| 5,579,156 A | * | 11/1996 | Faltermeier et al. | 359/363 |
| 5,625,415 A | * | 4/1997 | Ueno et al. | 348/350 |
| 5,703,714 A | * | 12/1997 | Kojima | 359/368 |
| 5,991,030 A | * | 11/1999 | Yamamoto et al. | 356/451 |
| 6,091,911 A | * | 7/2000 | Sakano et al. | 396/432 |
| 6,191,885 B1 | * | 2/2001 | Kitagawa | 359/368 |
| 2002/0141049 A1 | * | 10/2002 | Masuyama | 359/363 |

* cited by examiner

*Primary Examiner*—Ngoc-Yen Vu
(74) *Attorney, Agent, or Firm*—Sughrue Mion, PLLC

(57) ABSTRACT

A photographing system comprising a photographing-method input unit, a temporary exposure time setting unit, and an actual exposure time setting unit. The photographing-method input unit receives input of a photographing method. The temporary exposure time setting unit stores a look-up table in which the kind of photographing method is caused to correspond to a temporary-photographing exposure time that is used to obtain an appropriate actual-photographing exposure time. The temporary exposure time setting unit also obtains the temporary-photographing exposure time in accordance with the kind of input photographing method by making reference to the look-up table and inputs the obtained temporary-photographing exposure time to a camera controller. The actual exposure time setting unit sets an actual-photographing exposure time, based on a temporary-photographing image signal obtained in temporary photographing controlled by the camera controller in accordance with the temporary-photographing exposure time.

32 Claims, 4 Drawing Sheets

PHOTOGRAPHING SYSTEM WITH IMPROVED TIME SETTING

BACKGROUND OF THE INVENTION

1. Field of the Invention

The present invention relates generally to a photographing system, and more particularly to an improvement in a photographing time setting method that is carried out by a photographing apparatus.

2. Description of the Related Art

In the field of biological chemistry and molecular biology, a fluorescence detecting system using a fluorescent dye as a labeling material is hitherto known. According to this system, the evaluations or the like of the arrangement of a gene, the expression level of a gene, the path and state of the metabolism, absorption, and excretion of applied matter in a laboratory mouse, and the separation, identification, molecular weight, and characteristics of protein can be performed, by reading out image information related to a sample distributing a specific organism-originated matter labeled with a fluorescent dye.

For example, by utilizing electrophoresis which moves a living cell in suspension or a biological compound (protein, etc.) in a solution to a positive or negative electrode through an electric field as a result of electric charge, a plurality of deoxyribonucleic acid (DNA) fragments are electrophoresed on a gel support body, after a fluorescent dye has been added into a solution containing the plurality of DNA fragments. Or a plurality of DNA fragments are electrophoresed on a gel support body containing a fluorescent dye. Alternatively, after a plurality of DNA fragments have been electrophoresed on a gel support body, this gel support body is immersed into a solution containing a fluorescent dye. In this way, a gel support body (sample) distributing specific DNA fragments (organism-originated matter) labeled with fluorescence is obtained. Within a black box shielded from external light, the obtained gel support body placed on a suitable sample tray is irradiated with exciting light which excites the fluorescent dye employed as a labeling material. The fluorescence emitted from the gel support body is photoelectrically read out by photoelectric read means through a lens. In this way, image information representing a distribution of DNA fragments labeled with fluorescence is acquired, and based on the acquired image information, a visual image is displayed on a display section such as a CRT display, whereby the evaluation of the molecular weight of the DNA fragment and the like can be performed.

In the same field, on the other hand, a chemiluminescence method of photographing the image of chemiluminescence by employing photoelectric read means such as a charged-couple device (CCD) is known as a method of detecting a nucleic acid and protein in a membrane filter or the like after blotching. As an apparatus for photographing such an image of chemiluminescence, a photographing apparatus is known in which, as with the above-mentioned fluorescence detecting apparatus, a membrane filter or the like is placed on a suitable sample tray and housed within a black box shielded from external light. Within this black box, chemiluminescence emitted from the membrane filter or the like is photoelectrically read out by photoelectric read means through a lens, and in this way, image information representing a distribution of specific protein or the like reacting to a predetermined luminescent chemical substance is acquired.

Here, the above-mentioned photographing apparatus with the object of detecting chemiluminescence can also be used as a photographing apparatus for the aforementioned fluorescence detecting system, by further providing an exciting light source for exciting a fluorescent dye and an exciting-light cut filter for permitting only the incidence of fluorescence on the photoelectric read means and preventing the incidence of exciting light. Therefore, a photographing apparatus adding the function of detecting fluorescence to the photographing apparatus for chemiluminescence detection has been developed.

That is, in the case of performing photographing for chemiluminescence detection, exciting light is prevented from being emitted. Also, the exciting-light cut filter is removed from the optical path of chemiluminescence, and chemiluminescence emitted from a sample is detected by the photoelectric read means. In the case of performing photographing for fluorescence detection, on the other hand, a sample is illuminated with exciting light. The exciting-light cut filter is disposed in the optical path of the fluorescent cut filter emitted from the sample, and the light source and the exciting-light cut filter are switched separately or integrally such that fluorescence alone is detected by the photoelectric read means. Moreover, in the case where there is a great difference in intensity between fluorescence and chemiluminescence, the quantity of light to be incident on the photoelectric read means is adjusted by providing a variable diaphragm.

Furthermore, the aforementioned photographing apparatus can also be used as a digitizer, in which a translucent manuscript (film, etc.) or a reflecting manuscript (a photograph, etc.) is irradiated with illuminating light and the transmitted image or the reflected image is photoelectrically read out by photoelectric read means through a lens in order to obtain a digital image. In this case, the light to be emitted from the exciting light source employs white light, not exciting light in a band that can excite fluorescence. Also, the quantity of the transmitted light or reflected light to be incident on the photoelectric read means is limited.

Furthermore, some of the aforementioned photographing apparatuses rendering switching of a photographing method possible in accordance with a photographing object are known as being capable of photographing an image suitable for the size of a sample by varying a viewing angle that is incident on photoelectric read means through a lens. That is, in the apparatus capable of photographing an image suitable to the size of a sample, a plurality of sample-tray disposing sections each having a different distance from the lens are formed so as to place a sample tray thereon. The sample tray can be placed selectively on one sample-tray disposing section of the plurality of sample-tray disposing sections. The lens is moved in the optical axis direction in accordance with the selected sample-tray disposing section, whereby focusing on the light-receiving surface of the photoelectric read means is rendered possible.

The exposure of the photoelectric read means employed in the above-mentioned photographing apparatus, incidentally, is controlled by a camera controller. If the operator inputs instructions to start exposure and end exposure, the camera controller will control the start and end of photoelectric reading that is performed by the photoelectric read means. Thus, the camera controller constitutes the photographing system along with the photographing apparatus.

There are cases where the photographing system includes analysis computers (including personal computers) that perform quantitative analysis and the like by applying various kinds of image processing to an image signal read out by the photoelectric read means.

In the above-mentioned photographing system, incidentally, the operator inputs instructions to start exposure and end exposure to the camera controller or the analysis computer. However, there is a problem that it is difficult to suitably set exposure time from the start of exposure to the end of exposure. Particularly, because fluorescence and chemiluminescence are very weak, there is a need to perform exposure for a long time to obtain a certain degree of light quantity when the light is employed in quantitative analysis. In addition, suitable exposure time varies between the case of fluorescence detection and the case of chemiluminescence detection and also varies depending on the kind of labeling fluorescent dye or the kind of labeling chemical substance. Generally, it is possible to set such suitable exposure time by experience. However, in the case where there is a difference in the density of a sample or the case where a new kind of fluorescent dye or the like is employed, the actual situation is that exposure time can be set only by trial and error.

On the other hand, it is conceivable that a photo detector is provided in the interior of a black box separately from the photoelectric read means and, based on a quantity of light detected by this photo detector, exposure time is set to the photoelectric read means. However, it is practically impossible to detect weak light, such as fluorescence and chemiluminescence, with higher sensitivity than the photoelectric read means. Thus, it is impossible to provide such a photo detector.

SUMMARY OF THE INVENTION

The present invention has been made in view of the aforementioned circumstances. Accordingly, it is an object of the present invention to provide a photographing system that is capable of photographing a sample with an exposure time suitable for the sample without relying on an operator's experience.

To achieve this end, the photographing system according to the present invention performs temporary photographing for setting exposure time for actual photographing prior to the actual photographing for acquiring an image signal. Furthermore, the photographing system switches exposure time for the temporary photographing in accordance with a photographing method corresponding to the kind of sample to be photographed and/or the kind of light emitted from the sample.

That is, the photographing system of the present invention comprises a photographing apparatus, a camera controller, photographing-method input means, temporary exposure time setting means, and actual exposure time setting means. The photographing apparatus photographs light emitted from a sample as a two-dimensional image signal by photoelectric read means, the sample being provided within a black box shielded from light. The camera controller controls exposure time for photographing which is performed by the photoelectric read means. The photographing-method input means receives input of a photographing method corresponding to the kind of sample and/or the kind of light emitted from the sample. The temporary exposure time setting means stores a look-up table in which the kind of the photographing method is caused to correspond to temporary-photographing exposure time that is used to obtain proper actual-photographing exposure time, obtains the temporary-photographing exposure time in accordance with the kind of photographing method input from the photographing-method input means by making reference to the look-up table, and inputs the obtained temporary-photographing exposure time to the camera controller. The actual exposure time setting means sets actual-photographing exposure time, based on a temporary-photographing image signal obtained in temporary photographing controlled by the camera controller in accordance with the temporary-photographing exposure time and based on the temporary-photographing exposure time, and inputs the set actual-photographing exposure time in the camera controller.

The light emitted from the sample is, for example, fluorescence, chemiluminescence, illuminating light reflected from the sample, or illuminating light transmitted through the sample.

It is preferable that the aforementioned photoelectric read means employ an interline type CCD equipped with a cooling element, capable of having a wide dynamic range which can detect weak chemiluminescence and fluorescence with good linearity and also taking out a pseudo-dynamic image by reiteratively performing photoelectric reading in a short time. The present invention, however, is not to be limited to the interline type CCD. In the photoelectric read means employing the CCD, it is preferable that in the temporary photographing, the camera controller switch the CCD to photographing that is performed by a binning function. The reason for this is that by reading out a plurality of pixels as 1 pixel by means of the binning function, rapid reading can be realized, while ensuring a quantity of light per 1 pixel (in the case of a plurality of pixels handled as 1 pixel) to some degree.

The photographing method varies depending on the kind of sample to be photographed and/or the kind of light emitted from the sample. For instance, in the case of a sample (e.g., gel, etc.) distributing a specific organism-originated matter labeled with a fluorescent dye, the photographing method emits exciting light and disposes an exciting-light cut filter between the sample and the photoelectric read means so that the exciting light is not incident on the photoelectric read means. In the case of a sample (e.g., a membrane filter, etc.) distributing a specific organism-originated matter labeled with a chemical substance that emits chemiluminescence, the photographing method emits no exciting light and does not dispose the exciting-light cut filter between the sample and the photoelectric read means. Note that when light reflected from or transmitted through a sample (manuscript) is photographed, the photographing method emits illuminating light from the photoelectric read means side of the manuscript or from the opposite side of the manuscript from the photoelectric read means. In addition, when the light emitted from a sample is fluorescence, the photographing method is the same as the photographing method in the case of the above-mentioned sample distributing a specific organism-originated matter labeled with a fluorescent dye. Furthermore, when the light emitted from a sample is chemiluminescence, the photographing method is the same as the photographing method in the case of the above-mentioned sample distributing a specific organism-originated matter labeled with chemical substance.

In a preferred form of the present invention, the photographing system further includes display means for displaying the actual-photographing exposure time set by the actual exposure time setting means. One reason for this is that when the actual-photographing exposure time is set to a very long time, it becomes easy for an operator to determine whether actual photographing is in progress or the system has stopped due to a defect. Another reason is that because the set actual-photographing exposure time can be visually recognized, the operator does not need to be close to the photographing system until the end of actual photographing not knowing when the photographing will be finished, and therefore the display means is very useful in practical use.

The actual-photographing exposure time set by the actual exposure time setting means may have a fixed upper limit value. When the exposure time calculated by the actual exposure time setting means is over an excessively long time, the photographing system will be occupied for a long time by the sample. There are cases where, considering the attenuation of the quantity of light emitted from the sample, image signals with substantially little difference can be obtained between the case of such overexposure and the case where exposure is ended before that. In such a case, waste due to overexposure can be avoided. This is why the actual-photographing exposure time may have a fixed upper limit value.

The setting of the actual-photographing exposure time by the actual exposure time setting means may be performed based on part of the temporary-photographing image signal corresponding to part of the sample, obtained in accordance with the photographing method input to the photographing-method input means. The reason for this is as follows. There are cases where, depending on the kind of sample or the like, an area in the sample that emits light is limited to a fixed range. In such a case, it will be sufficient and desirable if actual-photographing exposure time is set only based on part of the temporary-photographing image signal corresponding to the fixed range.

The temporary exposure time setting means may have temporary-photographing exposure time input means for receiving input of temporary-photographing exposure time. When the temporary-photographing exposure time is input to the temporary-photographing exposure time input means, the temporary exposure time setting means may input the input temporary-photographing exposure time to the camera controller independently of the look-up table. The reason for this is that, when temporary photographing is desired in a changed temporary-photographing exposure time, it can easily be changed. In this case, the temporary exposure time setting means may rewrite the corresponding relationship set in the look-up table, based on the temporary-photographing exposure time input to the temporary-photographing exposure time input means and the photographing method input to the photographing-method input means. It is preferable that rewriting be performed in line with a statistical method. The "in line with a statistical method" is intended to mean, for example, a method of selecting the average value of the temporary-photographing exposure times input to the temporary-photographing exposure time input means for each photographing method input to the photographing-method input means.

Furthermore, the temporary exposure time setting means may further be equipped with look-up table rewriting means for directly rewriting the look-up table itself. The reason for this is that the look-up table rewriting means can easily cope with the case where a new photographing method is developed, or the like.

Note that the camera controller may be constructed integrally with the photographing apparatus.

Also, the input of the photographing method to the photographing-method input means does not need to be performed by the operator. For example, the input may be performed by detecting the contents set in the photographing apparatus by the operator, specifically the selecting operation of the presence of emission of the exciting or illuminating light, the selecting operation of the direction of emission of the illuminating light, the operation of the exposure diaphragm, and the selecting operation of the presence of the exciting-light cut filter by sensors or the like, respectively, and by inputting these results of detection. The reason for this is that, based on the above-mentioned results of detection, the photographing method can be determined unequivocally.

According to the photographing system of the present invention, the exposure time appropriate for the quantity of light emitted from a sample can be calculated prior to actual photographing for acquiring an image signal, by performing temporary photographing in order to set exposure time for actual photographing. Thus, there is no need to perform photographing by trail and error as in the prior art. Furthermore, exposure time for the temporary photographing can be switched in accordance with a photographing method corresponding to the kind of sample to be photographed and/or the kind of light emitted from the sample, so that an appropriate temporary-photographing exposure time can be selected in accordance with a photographing method, particularly the quantity of light which varies depending on the kind of light emitted from a sample.

That is, in the photographing system of the present invention, a photographing method is input to the photographing-method input means. Then, the temporary exposure time setting means obtains a temporary-photographing exposure time corresponding to the input photographing method by making reference to the look-up table. The obtained temporary-photographing exposure time is input to the camera controller, which in turn controls the photoelectric read means so that the photoelectric read means is exposed in accordance with the input temporary-photographing exposure time, thereby performing temporary photographing. Based on an image signal (temporary-photographing image signal) photographed with the photoelectric read means by this temporary photographing, the actual exposure time setting means sets actual-photographing exposure time. The camera controller controls the photoelectric read means so that the photoelectric read means is exposed in accordance with the set actual-photographing exposure time, thereby performing actual photographing for acquiring an image analyzing signal.

According to the photographing system of the present invention, as described above, a sample can be photographed in an exposure time appropriate for the sample without relying on experience. In addition, by adding only the above-mentioned construction to a conventional photographing system, the photographing system of the present invention capable of easily obtaining this effect can be constructed. Thus, the present invention is excellent in upgrade performance.

The above and many other objects, features and advantages of the present invention will become manifest to those skilled in the art upon making reference to the following detailed description and accompanying drawings in which preferred embodiments incorporating the principle of the present invention are shown by way of illustrative example.

DESCRIPTION OF THE PREFERRED EMBODIMENTS

Embodiments of a photographing system of the present invention will hereinafter be described with reference to the drawings.

Figure 1:
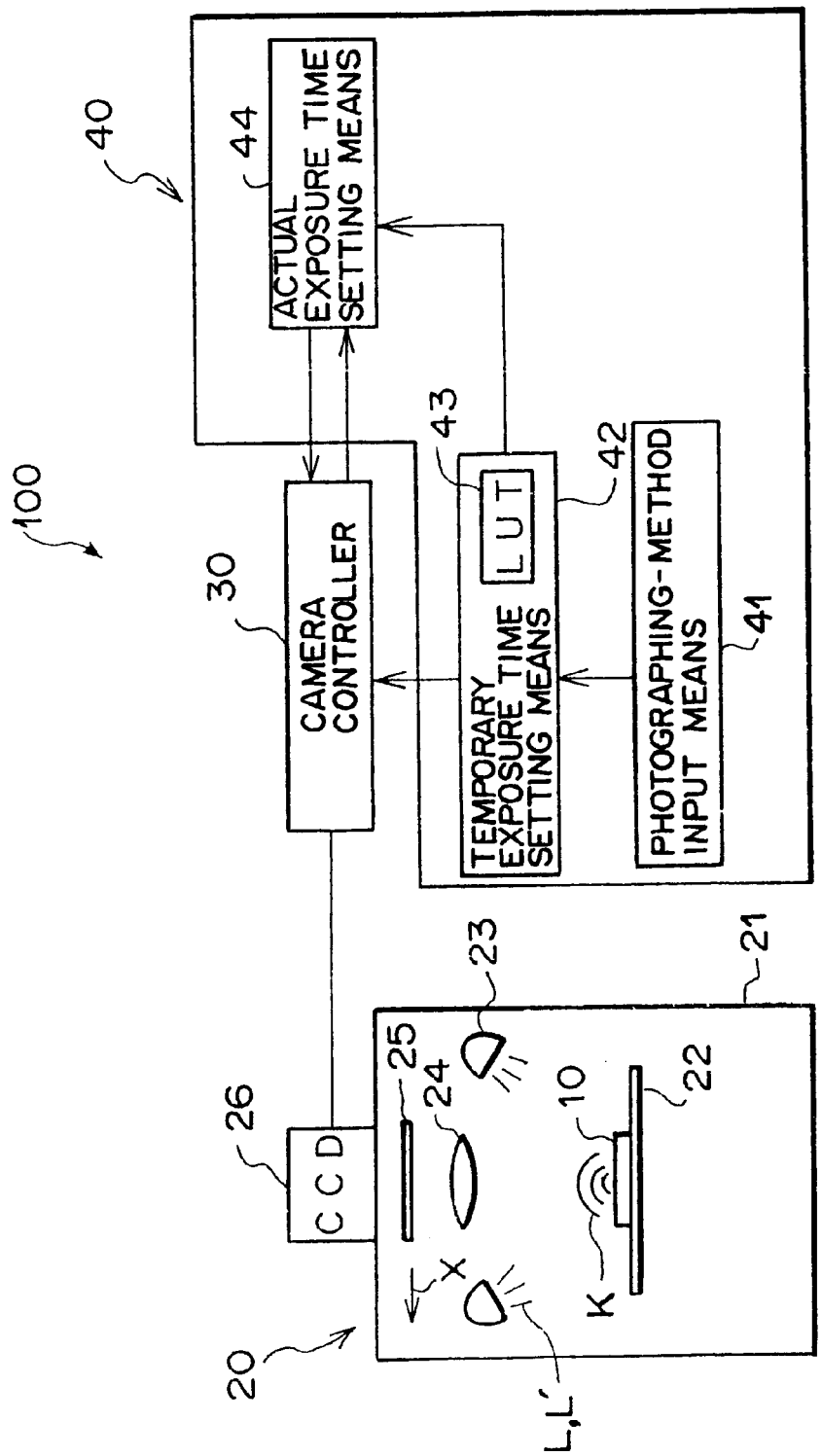
FIG. 1 is a block diagram showing the construction of a first embodiment of a photographing system of the present invention.

FIG. 1 shows a block diagram of the construction of a first embodiment of the photographing system 100 of the present invention. The photographing system 100 shown in the figure comprises a photographing apparatus 20 for performing photographing of a sample 10, a personal computer (PC) 40 for performing image processing, analysis processing and the like with respect to an image signal photographed by the photographing apparatus 20, and a camera controller 30 for controlling exposure time with respect to the photographing apparatus 20, based on the exposure time input by the PC 40.

The photographing apparatus 20 includes: (1) an interline type CCD 26 with a cooling element which is a form of photographic read means; (2) a tray 22 on which the sample 10 (which is a photographing object) is placed; (3) a lens 24 for forming the image of the sample 10 onto the light-receiving surface of the CCD 26; (4) a light source 23 for emitting exciting light L or illuminating light L' to the sample 10; and (5) an exciting-light cut filter 25 for preventing the incidence of the exciting light L on the CCD 26 and permitting the passage of fluorescence K emitted from the sample 10. The CCD 26, the tray 22, the lens 24, the light source 23, and the exciting-light cut filter 25 are provided within a black box 21 shielded from external light. Here, the light source 23 can be switched by the operator between the case of emitting exciting light L, the case of emitting illuminating light L', and the case of emitting neither exciting light L nor illuminating light L'. The exciting-light cut filter 25 is provided so that it can be inserted in or removed from an optical path between the sample 10 and the CCD 26. The exciting-light cut filter 25 can also be inserted or removed by the operator.

In addition to an analysis processing section (not shown) for performing the above-mentioned image processing and analysis processing, the PC 40 includes: (1) photographing-method input means 41 for receiving an input of a photographing method from an operator corresponding to the kind of sample 10 to be photographed and/or the kind of light to be emitted from the sample 10; (2) temporary exposure time setting means 42 for storing a look-up table (LUT) 43 in which the kind of photographing method is caused to correspond to exposure time for temporary photographing (temporary exposure time) that is used to obtain an appropriate exposure time for actual photographing, obtaining the temporary exposure time corresponding to the kind of photographing method input from the photographing-method input means 41 by making reference to the look-up table 43, and for inputting the obtained temporary exposure time to the camera controller 30; and (3) actual exposure time setting means 44 for setting an actual exposure time for actual photographing (actual exposure time), based on a temporary-photographing image signal obtained by temporary photographing controlled by the camera controller 30 in accordance with the temporary exposure time and based on the temporary exposure time input from the temporary exposure time setting means 42 and for inputting the set actual exposure time to the camera controller 30.

Here, the setting of the actual exposure time by the actual exposure time setting means 44 is performed, for example, as follows:

(1) Calculate the density histogram of an image obtained by temporary exposure, and (2) Calculate the density value ($D_L$) of the cumulative density histogram reaching a low-density level (e.g., 0.01%).

(3) Similarly, calculate the density value ($D_H$) of the cumulative density histogram reaching a high-density level (e.g., 99.5%).

(4) Obtain and determine the set time corresponding to a value of $D_H$–$D_L$ by making reference to the look-up table 43.

Note that when temporary exposure is performed with high sensitivity by employing the binning function and then actual exposure is performed in a highly fine mode of relatively lower sensitivity, it is desirable to provide an LUT suitable for a highly fine mode separately from the above-mentioned LUT 43 and then obtain a set time by making reference to the separately provided LUT. The LUT may be provided for each method.

In addition, it is more desirable that when a density histogram is obtained, the range of a reference image be a range excluding the unnecessary image of the circumferential portion, that is, only an area in a range of concern.

In the LUT 43, different temporary exposure times are caused to correspond to three photographing methods, a fluorescence detection method, a chemiluminescence detection method, and a reflected-light detection method, respectively.

Now, a description will be given of the operation of the photographing system of the first embodiment.

First, the operator places a gel, distributing specific DNA fragments labeled with a fluorescent dye, on the sample tray 22 of the photographing apparatus 20, disposes the exciting-light cut filter 25 between the sample 10 and the CCD 26, and switches the light source 23 so that it emits exciting light. This sequence of operations is performed for a photographing method for detecting fluorescence. Subsequently, the operator closes the door (not shown) of the black box 21, thereby shielding the interior of the black box 21 from external light.

Next, the operator inputs content, which represents that the photographing method set in the photographing apparatus 20 is a method for detecting fluorescence, to the photographing-method input means 41. The photographing-method input means 41 inputs the input photographing method to the temporary exposure time setting means 42. The temporary exposure time setting means 42 obtains a temporary exposure time corresponding to the fluorescence detection method that is the input photographing method, by making reference to the LUT 43 and then inputs the obtained temporary exposure time for fluorescence detection to the camera controller 30.

The camera controller 30 exposes the CCD 26 for the temporary exposure time for fluorescence detection input from the temporary exposure time setting means 42. Within the black box 21, the sample 10 is irradiated with the exciting light emitted from the light source 23. With this irradiation, the fluorescent dye distributed in the sample 10 is exited and emits fluorescence. This emitted fluorescence is projected onto the light-receiving surface of the CCD 26 through the lens 24 and the exciting-light cut filter 25. Next, the CCD 26 exposes the formed fluorescence-distributed image for the temporary exposure time and then inputs a temporary-photographing image signal, which represents a fluorescence-distributed image signal obtained by this temporary photographing, to the actual exposure time setting means 44 through the camera controller 30.

The actual exposure time setting means 44 calculates actual exposure time for obtaining an image signal suitable as an image analyzing signal, based on the input temporary-photographing image signal and the temporary exposure time executed for acquiring this temporary-photographing image signal, and then inputs the obtained actual exposure time to the camera controller 30.

The camera controller 30 exposes the CCD 26 for the actual exposure time input from the actual exposure time setting means 44. The CCD 26 exposes the fluorescence-distributed image formed on the light-receiving surface thereof for the actual exposure time and then inputs an actual-photographing image signal, which represents a fluorescence-distributed image signal obtained by this actual photographing, to the PC 40 through the camera controller 30. The actual-photographing image signal is used in analysis processing such as image processing, quantitative analysis and the like. At this time, the acquired actual-photographing image signal has gradation or the like suitable as an image analyzing signal, so analysis processing with high reliability or the like can be performed.

Although the above-mentioned operation applies to the case of setting the photographing method for fluorescence detection, the same operation also applies to the case of performing a photographing method for chemiluminescence detection, in which, in the photographing apparatus 20, the operator places, for example, a membrane filter, distributing specific protein labeled with chemical substance presenting chemiluminescence, as the sample 10 on the sample tray 22 of the photographing apparatus 20, removes the exciting-light cut filter 25 in the direction of arrow X from between the sample 10 and the CCD 26, and switches the light source 23 so that it emits neither exciting light L nor illuminating light L'.

The operator then closes the door (not shown) of the black box 21, thereby shielding the interior of the black box 21 from external light. Next, the operator inputs content, which represents that the photographing method set in the photographing apparatus 20 is a method for detecting chemiluminescence, to the photographing-method input means 41. The photographing-method input means 41 inputs the input photographing method to the temporary exposure time setting means 42. The temporary exposure time setting means 42 obtains a temporary exposure time corresponding to the chemiluminescence detection method that is the input photographing method, by making reference to the LUT 43 and then inputs the obtained temporary exposure time for chemiluminescence detection to the camera controller 30.

The camera controller 30 exposes the CCD 26 for the input temporary exposure time for chemiluminescence detection. Within the black box 21, the chemiluminescence matter distributed in the sample 10 emits chemiluminescence. This emitted chemiluminescence is projected onto the light-receiving surface of the CCD 26 through the lens 24. Next, the CCD 26 exposes the formed chemiluminescence-distributed image for the temporary exposure time and then inputs a temporary-photographing image signal, which represents a chemiluminescence-distributed image signal obtained by this temporary photographing, to the actual exposure time setting means 44 through the camera controller 30.

The actual exposure time setting means 44 calculates actual exposure time for obtaining an image signal suitable as an image analyzing signal, based on the input temporary-photographing image signal and the temporary exposure time executed to acquire this temporary-photographing image signal, and then inputs the obtained actual exposure time to the camera controller 30.

The camera controller 30 exposes the CCD 26 for the actual exposure time input from the actual exposure time setting means 44. The CCD 26 exposes the chemiluminescence-distributed image formed on the light-receiving surface thereof for the actual exposure time and then inputs an actual-photographing image signal, which represents a chemiluminescence-distributed image signal obtained by this actual photographing, to the PC 40 through the camera controller 30. The actual-photographing image signal is used in analysis processing such as image processing, quantitative analysis and the like. At this time, the acquired actual-photographing image signal has gradation or the like suitable as an image analyzing signal, so analysis processing with high reliability or the like can be performed.

In addition, in the method of photographing light reflected from a reflecting manuscript by (1) placing a reflecting manuscript on the sample tray 22 as the sample 10, (2) operating the light source 23 so that it emits illuminating light L', and (3) removing the exciting-light cut filter 25 from between the sample 10 and the CCD 26, an image signal having gradation or the like suitable as an image analyzing signal can be acquired in the same manner as the operation in the case where each of the above-mentioned photographing methods is input to the photographing-method input means 41.

Although, in the photographing system 100 of the first embodiment, the photographing-method input means 41, the temporary exposure time setting means 42, and the actual exposure time setting means 42 are constituted as part of the PC 40, the present invention is not to be limited to this example. These components may be separately provided independently of the photographing apparatus 20, the camera controller 30, and the PC 40, or may be constructed integrally with the photographing apparatus 20 or the camera controller 30. Furthermore, these components do not always need to be constructed integrally. For instance, the photographing-method input means 41 alone may be constructed integrally with the photographing apparatus 20.

In addition, input to the photographing-method input means 41 does not need to be performed by the operator. For example, the switched operational contents of the light source 23 and exciting-light cut filter 25 of the photographing apparatus 20 may be detected by sensors or the like, respectively, and based on these results of detection, the photographing-method input means 41 may automatically recognize a photographing method determined by a combination of these switching operations.

While the photographing system in the first embodiment has been described with regard to the case where the CCD 26 performs the same read operation as the case of actual photographing in the case of temporary photographing, the camera controller 30 may control the CCD 26 so that, in the case of temporary photographing, the CCD 26 reads out a plurality. of pixels as 1 pixel at the same time, not one by one, by the binning function of the CCD 26. For example, by reading out 4 pixels as 1 pixel, resolution is reduced but the light quantity of 4 pixels is handled as the light quantity of 1 pixel, so that temporary photographing can be performed with high sensitivity in a shorter time.

In addition, the setting of the actual exposure time by the actual exposure time setting means 44 may be performed based on part of the temporary-photographing image signal corresponding to part of the sample 10, obtained in accordance with the photographing method input to the photographing-method input means 41. There are cases where, depending on the kind or the like of the sample 10, an area in the sample 10 that emits light is limited to a fixed range. In such a case, it will be sufficient and desirable if actual exposure time is set only based on part of the temporary-photographing image signal corresponding to the fixed range.

Furthermore, the actual exposure time that is set by the actual exposure time setting means 44 may have a fixed upper limit value. When the actual exposure time calculated by the actual exposure time setting means 44 is over an excessively long time, the photographing system will be occupied for a long time by the sample 10. There are cases where, considering that the quantity of light emitted from the sample 10 is attenuated with the passage of time, image signals with substantially little difference can be obtained between the case of such overexposure and the case of exposure is ended before that. In such a case, waste, such as photographing time and the like, due to overexposure can be avoided.

Figure 2:
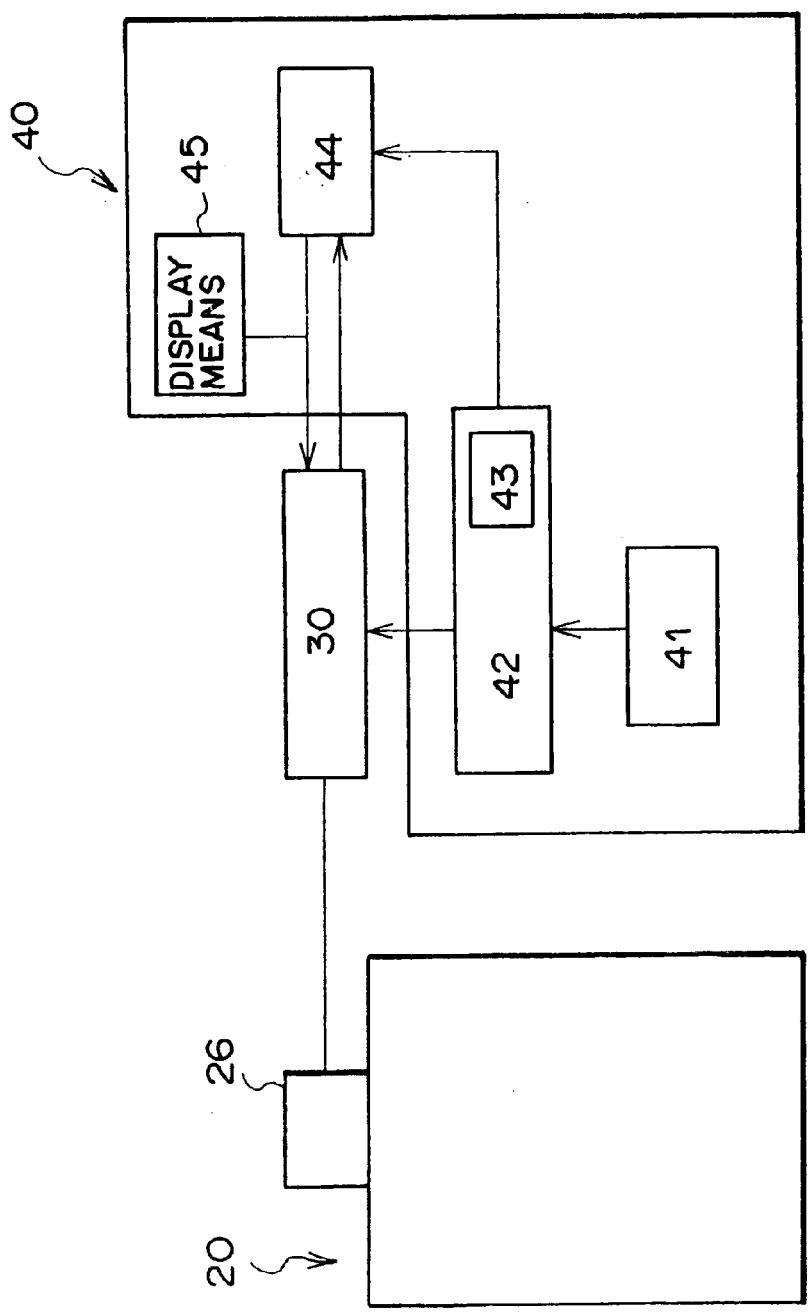
FIG. 2 is a block diagram showing the construction of a second embodiment of the photographing system of the present invention.

FIG. 2 shows a second embodiment of the photographing system of the present invention. The photographing system shown in the figure is identical in construction with the photographing system shown in FIG. 1 except that display means 45 for displaying the actual exposure time set by the actual exposure time setting means 44 is further added. By providing the display means 45 in this manner and displaying the set actual exposure time, the operator can clearly recognize the end time of actual photographing. Particularly, when actual exposure time is set to a very long time, the second embodiment is useful in practical use, because the operator does not need to be close to the photographing system until the end of actual photographing not knowing when the photographing will be finished, and can perform another operation in parallel with actual photographing. The second embodiment is also convenient when the operator views the displayed actual exposure time and forcibly ends actual photographing utilizing the operator's judgment before the actual exposure time elapses completely. That is, in the case where an operator's experience indicates that the actual-photographing image signal, obtained after the complete passage of the actual exposure time, has been overexposed, the displayed actual exposure time can be used as a standard when the actual exposure time is forcibly ended before the lapse of the actual exposure time.

Figure 3:
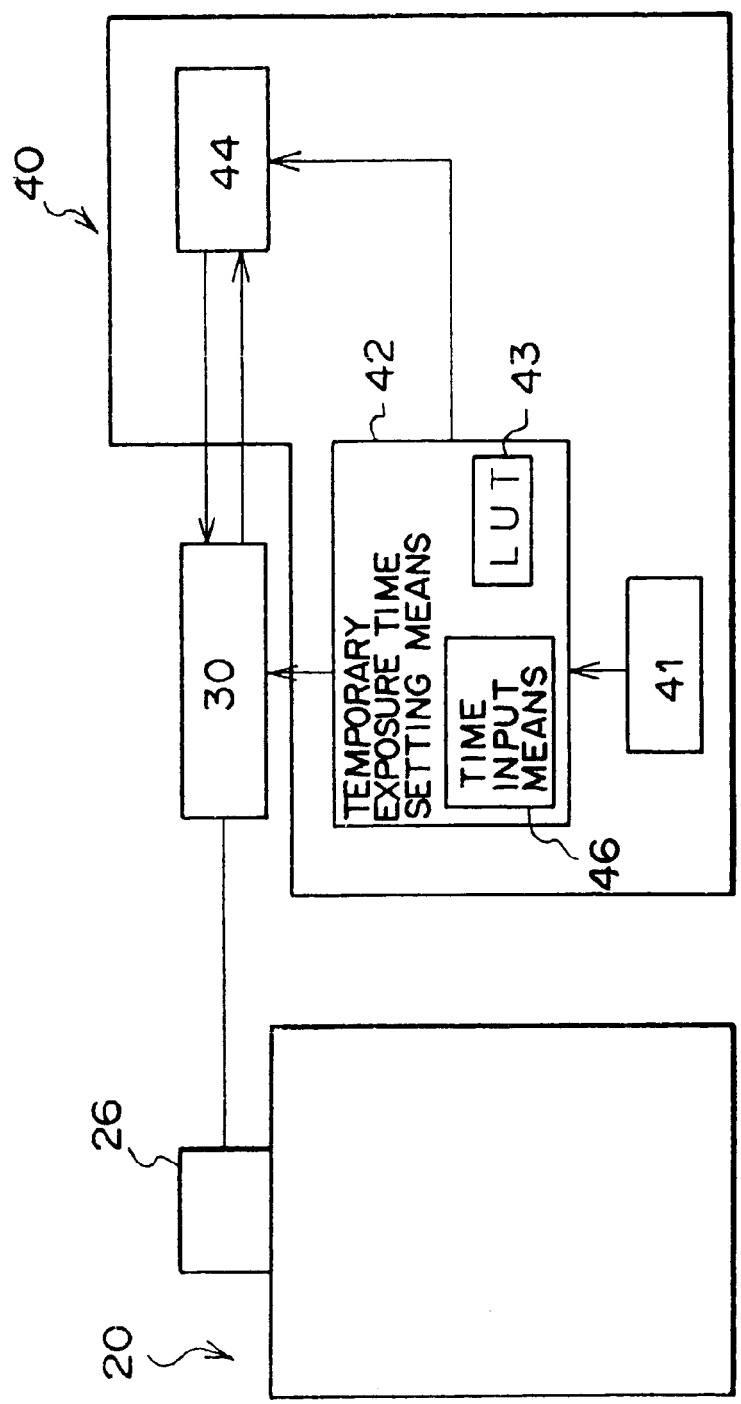
FIG. 3 is a block diagram showing the construction of a third embodiment of the photographing system of the present invention.

FIG. 3 shows a third embodiment of the photographing system of the present invention. The photographing system shown in the figure is identical in construction with the photographing system shown in FIG. 1 except that the temporary exposure time setting means 42 has temporary-photographing exposure time input means 46 for directly receiving external input of temporary exposure time. When temporary exposure time is manually input directly to this temporary-photographing exposure time input means 46, the temporary exposure time setting means 42 inputs the input temporary exposure time to the camera controller 30 independently of the corresponding relationship in the LUT 43.

According to the photographing system constructed in this manner, temporary exposure time can be input directly to the temporary-photographing exposure time input means 46. In this way, the temporary exposure time input to the temporary-photographing exposure time input means 46 is input to the camera controller 30 by the temporary exposure time setting means 42 and temporary photographing is performed using the temporary exposure time. Thus, the third embodiment is convenient in the case where temporary photographing is desired in a changed temporary exposure time (case where the temporary-photographing image signal, obtained by temporary photographing performed by temporary exposure time, has already been overexposed), the case where photographing is based on a photographing method that does not correspond to the temporary exposure time in the LUT 43, or the like.

Note that in the case of the third embodiment, the temporary exposure time setting means 42 may rewrite the corresponding relationship set in the LUT 43, based on the temporary exposure time input to the temporary-photographing exposure time input means 46 and the photographing method input to the photographing-method input means 41. It is preferable that rewriting of the LUT 43 be performed using a statistical method.

Figure 4:
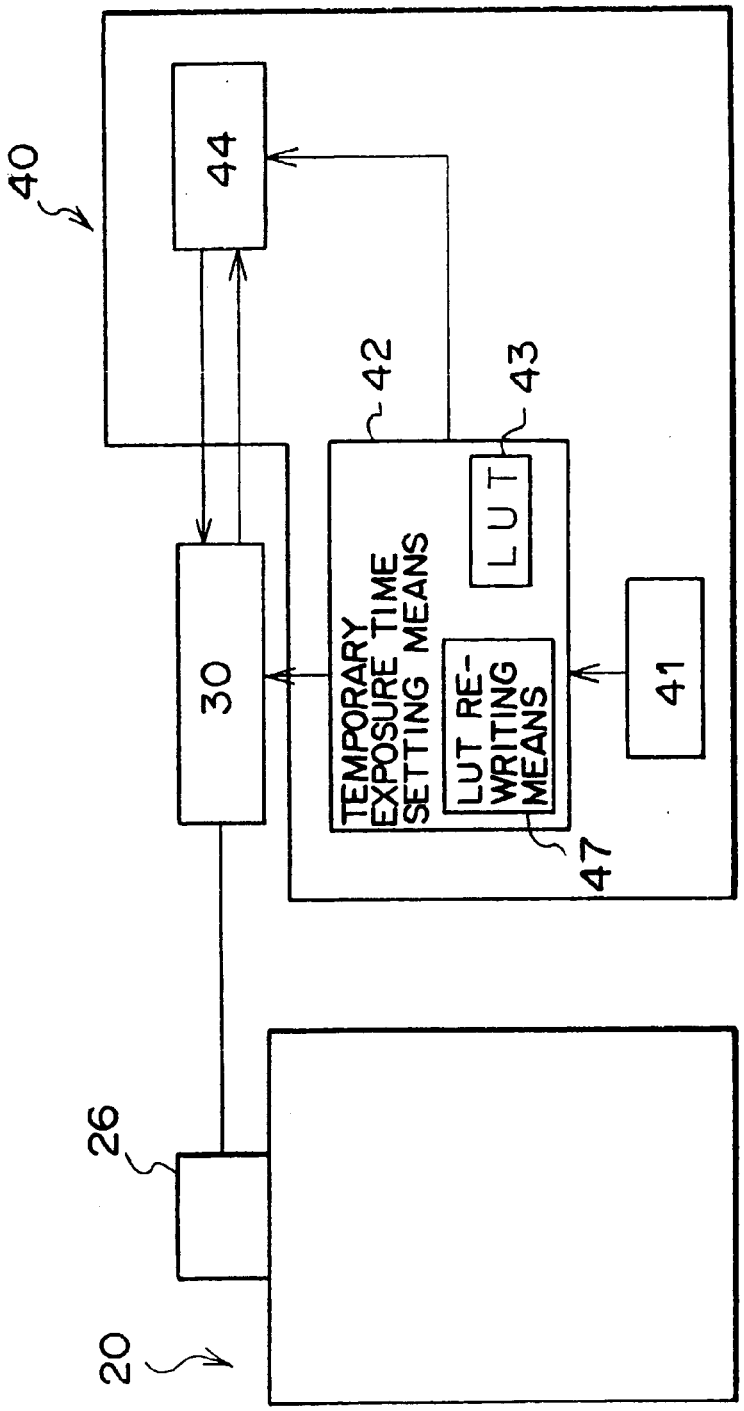
FIG. 4 is a block diagram showing the construction of a fourth embodiment of the photographing system of the present invention.

FIG. 4 shows a fourth embodiment of the photographing system of the present invention. The photographing system shown in the figure is identical in construction with the photographing system shown in FIG. 1 except that the temporary exposure time setting means 42 is equipped with look-up table (LUT) rewriting means 47 for directly rewriting the LUT 43 itself from the outside.

According to the photographing system of the fourth embodiment, when a new photographing method is caused to correspond to a temporary exposure time or when the content of the corresponding relationship in the LUT 43 is rewritten, or the like, the new corresponding relationship can be input to the LUT rewriting means 47. In this way, the LUT 45 can be changed directly without the need for the statistical method used in the photographing apparatus shown in FIG. 3, and consequently, a corresponding relationship can easily be obtained.

While, in the photographing system of each of the above-mentioned embodiments, the actual exposure time setting means 44 sets actual exposure time so that the actual-photographing image signal obtained by actual photographing has picture quality (gradation, etc.) suitable as an image-analyzing signal, the present invention is not to be limited to this. For example, the actual exposure time setting means 44 may set actual exposure time so that an image signal, obtained by adding a temporary-photographing image signal obtained by temporary photographing and an actual-photographing image signal obtained by actual photographing, represents suitable picture quality. Therefore, when only a temporary-photographing image signal obtained by temporary photographing represents suitable picture quality (in other words, when the exposure time of actual photographing for obtaining an actual-photographing image signal to be added to a temporary-photographing image signal is set to 0), the temporary-photographing image signal, as it is, may be employed as an image-analyzing signal without performing actual photographing.

What is claimed is:

1. A photographing system comprising:
   a photographing apparatus for photographing light emitted from a sample as a two-dimensional image signal by photoelectric read means, said sample being provided within a black box shielded from light;
   a camera controller for controlling exposure time for photographing which is performed by said photoelectric read means;

photographing-method input means for receiving input of a photographing method corresponding to the kind of said sample and/or the kind of said light emitted from said sample;

temporary exposure time setting means for storing a look-up table in which the kind of said photographing method is caused to correspond to a temporary-photographing exposure time that is used to obtain an appropriate actual-photographing exposure time, obtaining said temporary-photographing exposure time in accordance with the kind of said photographing method input from said photographing-method input means by making reference to said look-up table, and for inputting the obtained temporary-photographing exposure time to said camera controller; and actual exposure time setting means for setting an actual-photographing exposure time, based on a temporary-photographing image signal obtained in temporary photographing controlled by said camera controller in accordance with said temporary-photographing exposure time and based on said temporary-photographing exposure time, and for inputting the set actual-photographing exposure time to said camera controller.

2. The photographing system as set forth in claim 1, further comprising display means for displaying said actual-photographing exposure time set by said actual exposure time setting means.

3. The photographing system as set forth in claim 2, wherein the setting of said actual-photographing exposure time by said actual exposure time setting means is performed based on part of said temporary-photographing image signal corresponding to part of said sample, obtained in accordance with said photographing method input to said photographing-method input means.

4. The photographing system as set forth in claim 2, wherein said photoelectric read means is a charge-coupled device with a cooling element; and in said temporary photographing, said camera controller switches said charge-coupled device to photographing that is performed by a binning function.

5. The photographing system as set forth in claim 2, wherein said actual-photographing exposure time set by said actual exposure time setting means has a fixed upper limit value.

6. The photographing system as set forth in claim 2, wherein said temporary exposure time setting means has temporary-photographing exposure time input means for receiving input of a temporary-photographing exposure time; and when said temporary-photographing exposure time is input to said temporary-photographing exposure time input means, said temporary exposure time setting means inputs the input temporary-photographing exposure time to said camera controller independently of said look-up table.

7. The photographing system as set forth in claim 2, wherein said temporary exposure time setting means is further equipped with look-up table rewriting means for changing said temporary-photographing exposure time in said look-up table.

8. The photographing system as set forth in claim 2, wherein said light emitted from said sample is fluorescence, chemiluminescence, illuminating light reflected from said sample, or illuminating light transmitted through said sample.

9. The photographing system as set forth in claim 1, wherein the setting of said actual-photographing exposure time by said actual exposure time setting means is performed based on part of said temporary-photographing image signal corresponding to part of said sample, obtained in accordance with said photographing method input to said photo-graphing method input means.

10. The photographing system as set forth in claim 9, wherein said photoelectric read means is a charge-coupled device with a cooling element; and in said temporary photographing, said camera controller switches said charge-coupled device to photographing that is performed by a binning function.

11. The photographing system as set forth in claim 9, wherein said actual-photographing exposure time set by said actual exposure time setting means has a fixed upper limit value.

12. The photographing system as set forth in claim 9, wherein said temporary exposure time setting means has temporary-photographing exposure time input means for receiving input of a temporary-photographing exposure time; and when said temporary-photographing exposure time is input to said temporary-photographing exposure time input means, said temporary exposure time setting means inputs the input temporary-photographing exposure time to said camera controller independently of said look-up table.

13. The photographing system as set forth in claim 9, wherein said temporary exposure time setting means is further equipped with look-up table rewriting means for changing said temporary-photographing exposure time in said look-up table.

14. The photographing system as set forth in claim 9, wherein said light emitted from said sample is fluorescence, chemiluminescence, illuminating light reflected from said sample, or illuminating light transmitted through said sample.

15. The photographing system as set forth in claim 1, wherein said photoelectric read means is a charge-coupled device with a cooling element; and in said temporary photographing, said camera controller switches said charge-coupled device to photographing that is performed by a binning function.

16. The photographing system as set forth in claim 15, wherein said actual-photographing exposure time set by said actual exposure time setting means has a fixed upper limit value.

17. The photographing system as set forth in claim 15, wherein said temporary exposure time setting means has temporary-photographing exposure time input means for receiving input of a temporary-photographing exposure time; and when said temporary-photographing exposure time is input to said temporary-photographing exposure time input means, said temporary exposure time setting means inputs the input temporary-photographing exposure time to said camera controller independently of said look-up table.

18. The photographing system as set forth in claim 15, wherein said temporary exposure time setting means is further equipped with look-up table rewriting means for changing said temporary-photographing exposure time in said look-up table.

19. The photographing system as set forth in claim 15, wherein said light emitted from said sample is fluorescence, chemiluminescence, illuminating light reflected from said sample, or illuminating light transmitted through said sample.

20. The photographing system as set forth in claim 1, wherein said actual-photographing exposure time set by said actual exposure time setting means has a fixed upper limit value.

21. The photographing system as set forth in claim 20, wherein said temporary exposure time setting means has temporary-photographing exposure time input means for receiving input of a temporary-photographing exposure time; and when said temporary-photographing exposure time is input to said temporary-photographing exposure time input means, said temporary exposure time setting means inputs the input temporary-photographing exposure time to said camera controller independently of said look-up table.

22. The photographing system as set forth in claim 20, wherein said temporary exposure time setting means is further equipped with look-up table rewriting means for changing said temporary-photographing exposure time in said look-up table.

23. The photographing system as set forth in claim 20, wherein said light emitted from said sample is fluorescence, chemiluminescence, illuminating light reflected from said sample, or illuminating light transmitted through said sample.

24. The photographing system as set forth in claim 1, wherein said temporary exposure time setting means has temporary-photographing exposure time input means for receiving input of a temporary-photographing exposure time; and when said temporary-photographing exposure time is input to said temporary-photographing exposure time input means, said temporary exposure time setting means inputs the input temporary-photographing exposure time to said camera controller independently of said look-up table.

25. The photographing system as set forth in claim 24, wherein said temporary exposure time setting means is further equipped with look-up table rewriting means for changing said temporary-photographing exposure time in said look-up table.

26. The photographing system as set forth in claim 24, wherein said light emitted from said sample is fluorescence, chemiluminescence, illuminating light reflected from said sample, or illuminating light transmitted through said sample.

27. The photographing system as set forth in claim 24, wherein said temporary exposure time setting means rewrites the corresponding relationship set in said look-up table, based on said temporary-photographing exposure time input to said temporary-photographing exposure time input means and said photographing method input to said photographing-method input means.

28. The photographing system as set forth in claim 27, wherein said temporary exposure time setting means is further equipped with look-up table rewriting means for changing said temporary-photographing exposure time in said look-up table.

29. The photographing system as set forth in claim 27, wherein said light emitted from said sample is fluorescence, chemiluminescence, illuminating light reflected from said sample, or illuminating light transmitted through said sample.

30. The photographing system as set forth in claim 1, wherein said temporary exposure time setting means is further equipped with look-up table rewriting means for changing said temporary-photographing exposure time in said look-up table.

31. The photographing system as set forth in claim 30, wherein said light emitted from said sample is fluorescence, chemiluminescence, illuminating light reflected from said sample, or illuminating light transmitted through said sample.

32. The photographing system as set forth in claim 1, wherein said light emitted from said sample is fluorescence, chemiluminescence, illuminating light reflected from said sample, or illuminating light transmitted through said sample.

* * * * *